United States Patent
Gile

(10) Patent No.: US 9,934,390 B2
(45) Date of Patent: Apr. 3, 2018

(54) DATA REDACTION SYSTEM

(71) Applicant: EMC Corporation, Hopkinton, MA (US)

(72) Inventor: Michael Scott Gile, Superior, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 14/035,034

(22) Filed: Sep. 24, 2013

(65) Prior Publication Data
US 2015/0089663 A1 Mar. 26, 2015

(51) Int. Cl.
*G06F 21/62* (2013.01)

(52) U.S. Cl.
CPC .......... *G06F 21/62* (2013.01); *G06F 21/6218* (2013.01)

(58) Field of Classification Search
CPC ...... G06F 21/10; G06F 21/62; G06F 21/6209; G06F 21/6218; G06F 21/6227; G06F 21/6245; G06F 2221/2141; G11B 20/00086
USPC .......................................................... 726/27
See application file for complete search history.

(56) References Cited

U.S. PATENT DOCUMENTS

| | | | |
|---|---|---|---|
| 7,725,730 B2 | 5/2010 | Juels et al. | |
| 7,748,027 B2 * | 6/2010 | Patrick | G06F 21/62 709/224 |
| 8,301,901 B2 | 10/2012 | Buss | |
| 8,468,244 B2 * | 6/2013 | Redlich | G06Q 10/06 705/50 |
| 8,571,990 B2 | 10/2013 | Buss | |
| 8,572,686 B2 | 10/2013 | Radhakrishnan | |
| 8,751,568 B1 * | 6/2014 | Mears | H04L 67/28 709/203 |
| 8,776,249 B1 * | 7/2014 | Margolin | G06F 21/606 380/277 |
| 8,819,803 B1 | 8/2014 | Richards et al. | |
| 8,826,443 B1 * | 9/2014 | Raman | G06F 11/004 726/26 |
| 8,850,546 B1 | 9/2014 | Field et al. | |
| 8,925,053 B1 | 12/2014 | Mehta | |
| 8,978,122 B1 | 3/2015 | Zolfonoon et al. | |
| 8,990,911 B2 | 3/2015 | Olden et al. | |
| 2002/0083079 A1 * | 6/2002 | Meier | G06F 17/30011 |
| 2005/0071432 A1 * | 3/2005 | Royston, III | G06F 21/55 709/206 |
| 2006/0259614 A1 | 11/2006 | Patrick | |
| 2006/0259954 A1 | 11/2006 | Patrick | |
| 2006/0259977 A1 | 11/2006 | Patrick | |

(Continued)

*Primary Examiner* — Minh Dinh
(74) *Attorney, Agent, or Firm* — BainwoodHuang

(57) ABSTRACT

An electronic data storage and retrieval system comprising one or more first computing devices and a second computing device. The one or more first computing devices comprise a plurality of first data files, wherein, each of the plurality of first data files is associated with a first authentication level. The second computing device is associated with a second authentication level. Upon receiving a request to provide at least one of the plurality of first data files from the second computing device, the one or more first computing devices compares the first authentication level with the second authentication level, and creates a copy of the at least one of the plurality of first data files. The copy of the at least one of the plurality of first data files comprises a portion of the at least one of the plurality of first data files.

12 Claims, 4 Drawing Sheets

(56) References Cited

U.S. PATENT DOCUMENTS

| | | | |
|---|---|---|---|
| 2006/0259983 A1 | 11/2006 | Sperry | |
| 2006/0277220 A1 | 12/2006 | Patrick et al. | |
| 2007/0030528 A1 | 2/2007 | Quaeler et al. | |
| 2010/0241844 A1* | 9/2010 | Hussain | G06F 21/6218 713/150 |
| 2010/0293238 A1* | 11/2010 | Nottingham | G06Q 10/107 709/206 |
| 2012/0159296 A1* | 6/2012 | Rebstock | G06Q 10/00 715/205 |
| 2012/0240238 A1* | 9/2012 | Gates | H04N 21/41407 726/26 |
| 2013/0016115 A1* | 1/2013 | Minert | G06Q 10/06 345/589 |
| 2013/0080611 A1* | 3/2013 | Li | H04N 21/222 709/223 |
| 2013/0151346 A1* | 6/2013 | Schoen | G06Q 30/02 705/14.66 |
| 2013/0179450 A1* | 7/2013 | Chitiveli | G06F 21/6218 707/737 |
| 2014/0136941 A1* | 5/2014 | Avrahami | G06F 21/6245 715/229 |
| 2015/0295917 A1 | 10/2015 | Platt et al. | |

\* cited by examiner

DATA REDACTION SYSTEM

FIELD OF THE INVENTION

The present invention relates to the real-time removal of information from a requested electronic data file. In particular, but not by way of limitation, the present invention relates to an electronic data file retrieval and redaction system, wherein at least a portion of the content of the data file may be redacted based on one or more authentication settings.

BACKGROUND OF THE INVENTION

Prior data file retrieval systems prevented unauthorized access or data file content by storing one or more copies of the data file with the unauthorized content removed from the data file. In such systems, the entire data file without the redacted information may be unavailable since only one or more data files with at least a portion of the content being redacted may be stored on the system. Furthermore, a large number of data file copies may be stored on the system, with each copy having a separate portion of the data file removed. Due to multiple copies of each data file being stored, such prior art systems require increased storage capacity.

SUMMARY OF THE INVENTION

In order to overcome the challenge of storing and managing multiple copies of a data file, limit the storage capacity of prior art data redaction systems, and have the ability to provide an un-redacted data file copy in real-time, a data redaction method, system, and transitory storage medium have been created. One such method comprises a method of providing electronic data. The method of providing electronic data comprises storing a first copy of a data file on a first computing device. A first authentication level may be associated with the first copy of the data file. The method further comprises receiving at the first computing device a request for the data file. One such request may be received from a second computing device. A second authentication level associated with the request may be determined. The first authentication level and second authentication level may be used to create a second copy of the data file, with the second copy of the data file comprising a portion of the first copy of the data file. The second copy of the data file may then be sent to the second computing device.

Another embodiment of the invention comprises an electronic data storage and retrieval system. One electronic data storage and retrieval system comprises one or more first computing devices and at least one second computing device. The one or more first computing devices comprise one or more first data files. Each of the one or more first data files may be associated with a first authentication level, while the second computing device may be associated with a second authentication level.

Upon receiving a request to provide at least one of the one or more first data files, the one or more first computing devices compares the first authentication level with the second authentication level and creates a copy of the at least one of the one or more first data files. The copy of the one or more first data files comprises at least a portion of the at least one of the one or more first data files. The copy of the one or more first data files may then be sent to the second computing device.

Yet another embodiment of the invention comprises a non-transitory, tangible computer readable storage medium, encoded with processor readable instructions to perform a method of providing a first data file to a remote device. Such a method may comprise receiving a request for the first data file from the remote device. The instructions may further identify a file type and authentication level for the first data file as well as a second authentication level associated with the request for the first data file. One or more redaction modules may then be implemented, with each of the one or more redaction modules adapted to remove a portion of the first data file if (i) content associated with that redaction module is found in the first data file and the first and (ii) second authentication levels provide that at least a portion of such content is unauthorized content. The one or more redaction modules may then create a redaction module data file comprising the data file with the portion of the content being removed. Each of the redaction module data files may then be aggregated into a single data file, which may comprise a second data file. The second data file may then be provided to the remote device.

The above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
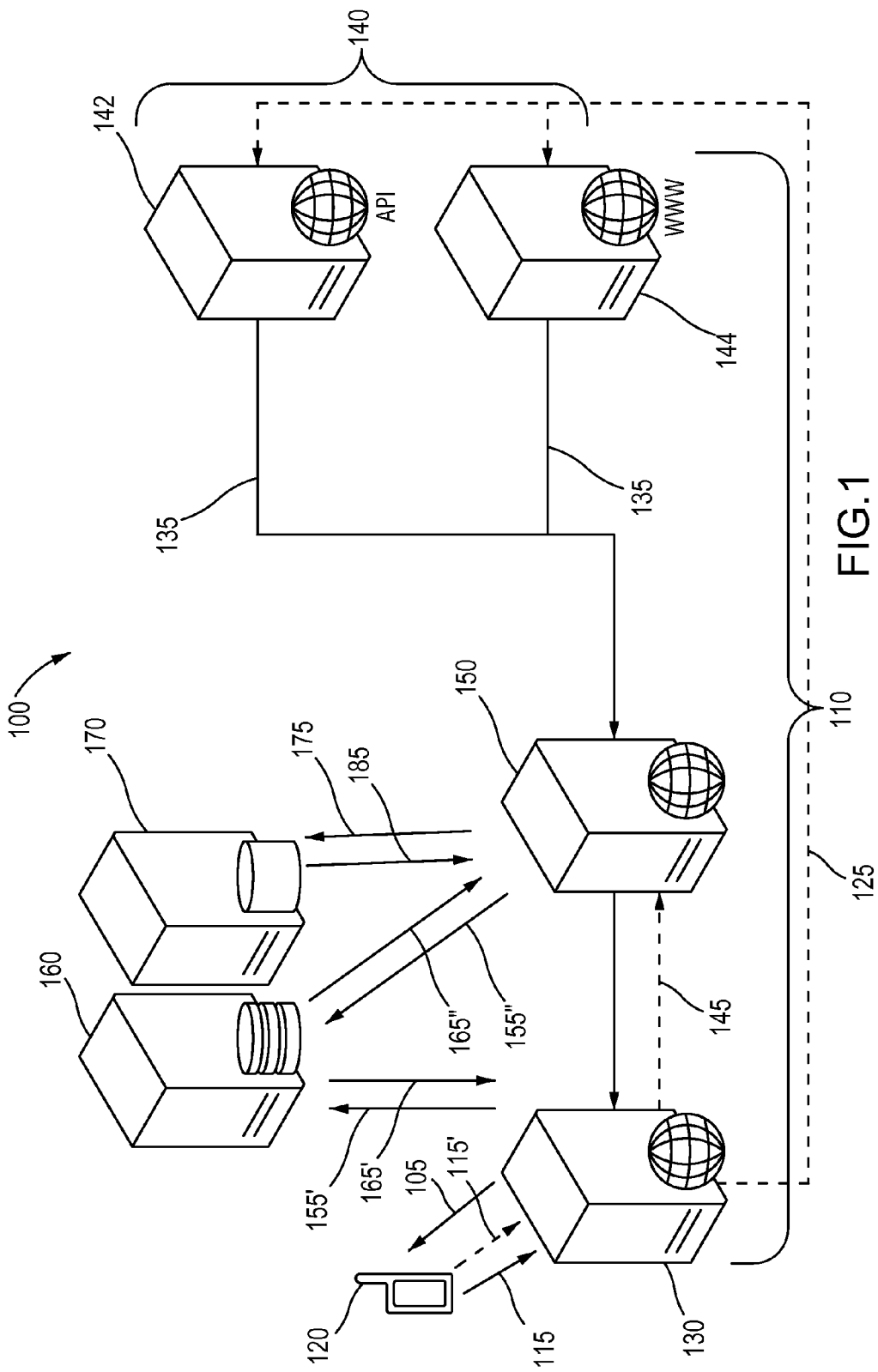
FIG. 1 depicts an electronic data storage and retrieval system according to one embodiment of the invention.

Turning first to FIG. 1, seen is an embodiment of electronic data storage and retrieval system 100. One such system 100 comprises one or more first computing devices 110 and at least one second computing device 120. In one embodiment the one or more first computing devices 110 may comprise one or more reverse proxy computing devices 130, one or more application computing devices 140, one or more data removal computing devices 150, and one or more authentication computing devices 160. The one or more first computing devices 110 may also comprise one or more cache computing devices 170. It is contemplated that one or more of the one or more reverse proxy computing devices 130, one or more application computing devices 140, one or more data removal computing devices 150, one or more authentication computing devices 160, and one or more cache computing devices 170 may comprise a single, or the same, device.

Whatever the configuration of the one or more first computing devices 110, the one or more first computing devices 110 comprise a plurality of first data files. In one embodiment, the plurality of data files are stored on the one or more application computing devices 140 such as, but not limited to, a web API server 142 and/or a web application server 144. A first authentication level may be associated with each of the plurality of first data files and a second authentication level may be associated with the second computing device 120. As described below, the first authentication level may be compared to the second authentication level at the one or more data removal computing devices 150 and/or proxy device 130 to determine which portion(s), if any, of the first data files may be redacted prior to sending 105 the file to the second computing device 120 upon receiving a request 115 from the second computing device 120 to obtain the file. One request 115 may comprise an http data stream request. Other request types known in the art are contemplated.

In one embodiment, the reverse proxy device 130 may initially receive the request 115 from the second computing device 120 and may subsequently forward 125 the request 115 to the appropriate application computing device 140, which may then, in turn, send 135 a copy of the file or files identified in the request 130 to the data removal computing device 150 assigned to handle the request 115. Also provided to the data removal computing device 150 may be information associated with the first authentication level and information associated with the second authentication level.

For example, an authentication token comprising information associated with the second authentication level may be provided to the data removal computing device 150 from the reverse proxy computing device 130. In such an embodiment, the reverse proxy device 130 may directly 145 provide the authentication token to the data removal device 150 or the authentication token may be provided in or with the forward 125 to the application device 140 and subsequently sent 135 to the data removal device 150. The authentication token may be created by the reverse proxy 130, second computing device 120, and/or any other device. In one embodiment, the token may be created using a username and/or password information supplied by the second computing device 120 and/or a user of the second computing device 120. Upon obtaining the username/password information or the authentication token, the reverse proxy 130 or data removal device 150 may contact 155' the authentication device 160 and receive 165' a first authentication level, associated with the requested file. In one embodiment, the first authentication level may comprise a content access setting identifying which types of content may be provided to the second computing device 120 and/or kept from being sent to the second computing device 120.

One first authentication level may be obtained by the data removal device 150 upon the data removal device 150 receiving the first data file from the application device 140. For example, the data removal device 150 may contact 155" the authentication device 160 upon receiving the first data file from the application device 140 and receive 165" an authentication packet from the authentication device 160, with the authentication packet comprising the first authentication level. The authentication packet may identify which content types may be accessed for various username/password combinations. Alternatively, the authentication packet may comprise a data structure comprising all known user authorization data, which the data removal device 150 may use to consult one or more files or database entries, which inform the data removal device 150 how to identify portions of the request 115 to redact.

Upon receiving the request 115 and first data file identified in the request 115, authentication token and authentication packet, the data removal device 150 may analyze the request and first data file to determine the content of the data file. The data removal device 150 may then compare the authentication packet to the authentication token to determine which content types may be provided to the second computing device 120 and/or which content types to redact prior to sending the second computing device 120 the requested data files. The content of the data file is then compared to the identified allowable content/content to redact and the allowable content in the data file may be left unmodified while the content to redact may be removed from the data file or otherwise prevented from the second device 120 having the ability to display/obtain the content. A new data file, comprising a second data file of modified first data file content may then be created and provided to the second computing device 120.

In one such example, the authentication packet and authentication token may inform the data removal device 150 that the second computing device 120 may receive all data except any contact information and financial information within the content of the data file(s) requested. Upon determining whether and where the data file comprises any contact and/or financial information, the data removal device 150 may subsequently remove this information from the file(s) or otherwise block this information from being provided to the second computing device 120. If the authentication packet and authentication token inform the data removal device 150 that the second computing device 120 has access to all requested data, then the entire first data file is provided in the response 105 and no content is redacted from the file or files sent to the device 120.

Figure 2:
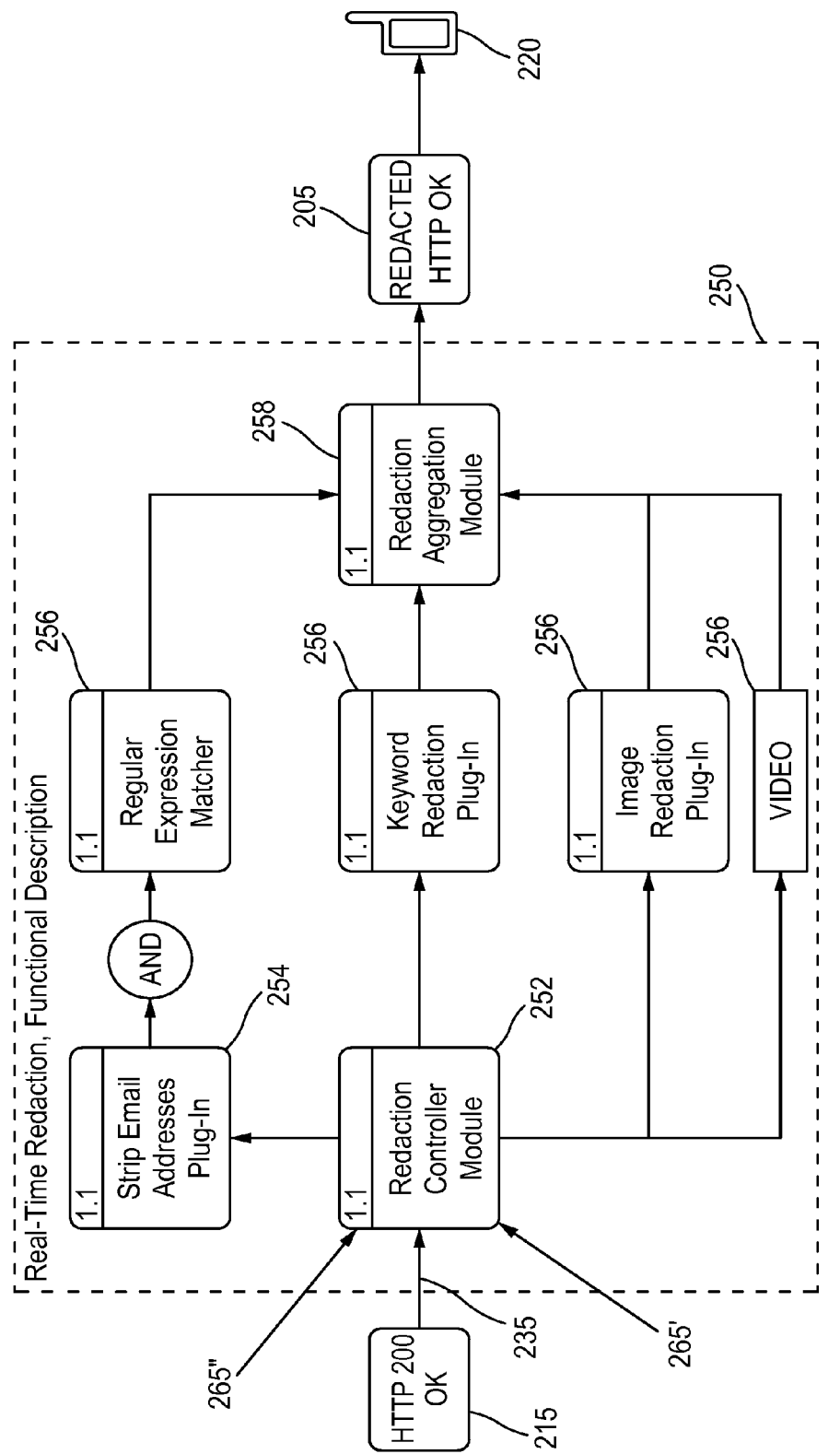
FIG. 2 depicts a block diagram of at least a portion of a method of providing a first data file to a remote device according to one embodiment of the invention.

The financial and/or contact information described in the example above may be removed from the first data file(s) received from the application device 140 through the use of or more redaction modules. For example, turning to FIG. 2, seen is a block diagram representation of at least a portion of the data removal device 250. The data removal device 250 may (i) receive the request 215 which was sent 235 from the application device 140, as seen in FIG. 1, (ii) receive 265" the authentication packet from the authentication device 160, as seen in FIG. 1, and (ii) receive 265' the authentication token. As seen in FIG. 2, the control module 252 may initially process the request 215, authentication packet and authentication token, and determine which content, if any, to redact from the message. One or more plug-ins may be called if the appropriate content is found in the first data file. Alternatively, the one or more plug-ins may also determine if the data comprises the content and if so, remove any unauthorized content. For example, if a content identifier portion of the redaction control module 252 identifies the first data file as comprising an email address, the strip email addresses plug-in module 254 may be called to delete or otherwise replace the email address with non-objectionable content. Similarly, additional plug-in modules 256 for removing at least portions of specified expressions, keywords, images, media, audio and/or video may be called if the control module 252 determines that the data file comprises such content, respectively. Modules 256 may further comprise a text string redaction module, an image matching redaction module, a media redaction module such as, but not limited to, audio or video, and a binary code redaction module. Other document-specific redaction modules are also contemplated. One such document-specific redaction module may comprise a redaction module to remove all or a portion of, for example, a pdf file. Other file types are also contemplated. Additionally, exact-matches, near-matches, close-matches, or similar-matches of one or more keywords or expressions in identified text strings may be removed from the data file. Similarly, image recognition software may be implemented by an image or video redaction module and recognized images may be redacted from the data file.

Such redaction may occur by modifying the colors on a pixel-by-pixel and/or a frame-by-frame basis. It is also contemplated that the redaction modules 256 may also include content identification The modules may provide the output of the module processing to an aggregation module 258. The aggregation module 258 may combine the information received from each of the plug-in modules 254, 256 and create a final version of the data file to send to the second computing device 220. Such a final version may comprise a copy of the first data file and may be referred to as a second data file. The second data file comprising the copy of the at least one of the plurality of first data files may be placed in a response 205 message to the second computing device 220. The response 205, like the request 215, may comprise an HTTP message. Other message types are contemplated.

Returning now to FIG. 1, upon creating the response 105 and including one or more second data files in the response 105, the data removal device 150 may communicate 175 with the cache 170, providing the cache 170 with the one or more second data files to store the one or more second data files. If the data removal device 150 receives a future request 115', authentication token, and authentication packet similar to the request 115, authentication token, and authentication packet used to create the second data file stored on the cache, the second data file related to the future request 115' may be substantially similar or the same as the second data file created for the request 115. In such an event, the data removal device 150 may obtain 185 the second data file from the cache 170, which may store second data files from previous requests for predetermined period of time.

Upon comparing the first authentication level with the second authentication level and identifying that at least a portion of the content in the first data file received from the application device 140 must be removed prior to sending the data file to the second computing device 120, the data removal device 150 may create a copy of the first data file. Such a copy may comprise an identified portion of the content of the first data file being removed. The data file copy may then be provided from the data removal device 150 to the second computing device 120 through the proxy 130. Therefore, the copy of the at least one of the plurality of first data files sent to the second computing device 120 comprises at least a portion of the at least one of the plurality of first data files stored on and received from the application device 140.

Figure 3:
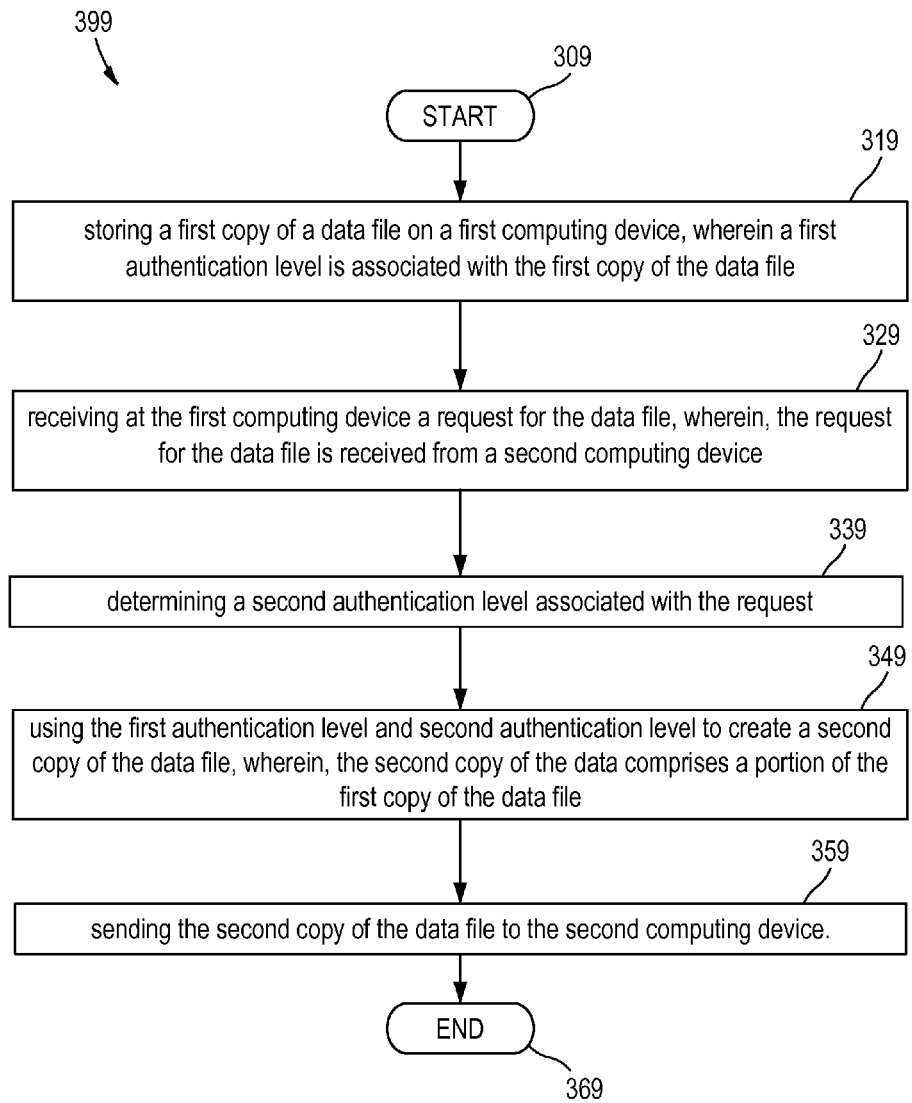
FIG. 3 depicts a method of providing electronic data according to one embodiment of the invention.

Turning now to FIG. 3, seen is a method 399 of providing electronic data. One method 399 starts at 309 and at 319 comprises storing a first copy of a data file on a first computing device, wherein a first authentication level is associated with the first copy of the data file. As described above with reference to FIG. 1, the first computing device 110 may comprise one or more devices which may include the proxy 130, application 140, data removal 150, authentication 160 and/or cache 170 devices. In one such embodiment, the first copy of a data file may comprise a plurality of data files stored on one or more application devices 140. The first authentication level may comprise information received in an authentication packet. For example, and as described above, the authentication packet comprises information related to the types of data which may be sent and/or redacted in any response 105 message for a given username/password or authentication token.

At step 329, the method 399 comprises receiving at the first computing device 110 a request 115 for the data file, wherein the request 115 for the data file is received from a second computing device 120. In one such embodiment, the second computing device 120 may comprise a remote mobile computing device or may comprise a desktop computing device or any other type of computing device known in the art. The request for the data file may comprise an http request from at least one of a mobile computing device browser and a mobile computing device application.

At step 339 the method 399 continues with determining a second authentication level associated with the request 115. As also described above, the second authentication level may be associated with information in an authentication token such as, but not limited to, a username and/or password associated with the request 115. As described in step 349 of the method 399, such a second authentication level may be used with the first authentication level to create a second copy of the data file. For example, the information in the authentication packet may be compared to the information in the authentication token to determine which of one or more redaction modules 256, seen in FIG. 2, to implement. Upon identifying the content of the first data file and the level of access granted with the username/pas sword, one or more portions of the first data file may be redacted in a real-time manner from the first data file with the redaction modules 256 prior to creating a second copy of the data file, seen at step 349 of the method 399 and sending the second copy of the data file to the second computing device 120, seen at step 359. Using the first authentication level and second authentication level to create a second copy of the data file comprises aggregating information received form the text string redaction module, image matching redaction module, and binary code redaction module to create the second copy of the data file. The method 399 in FIG. 3 ends at 369.

Figure 4:
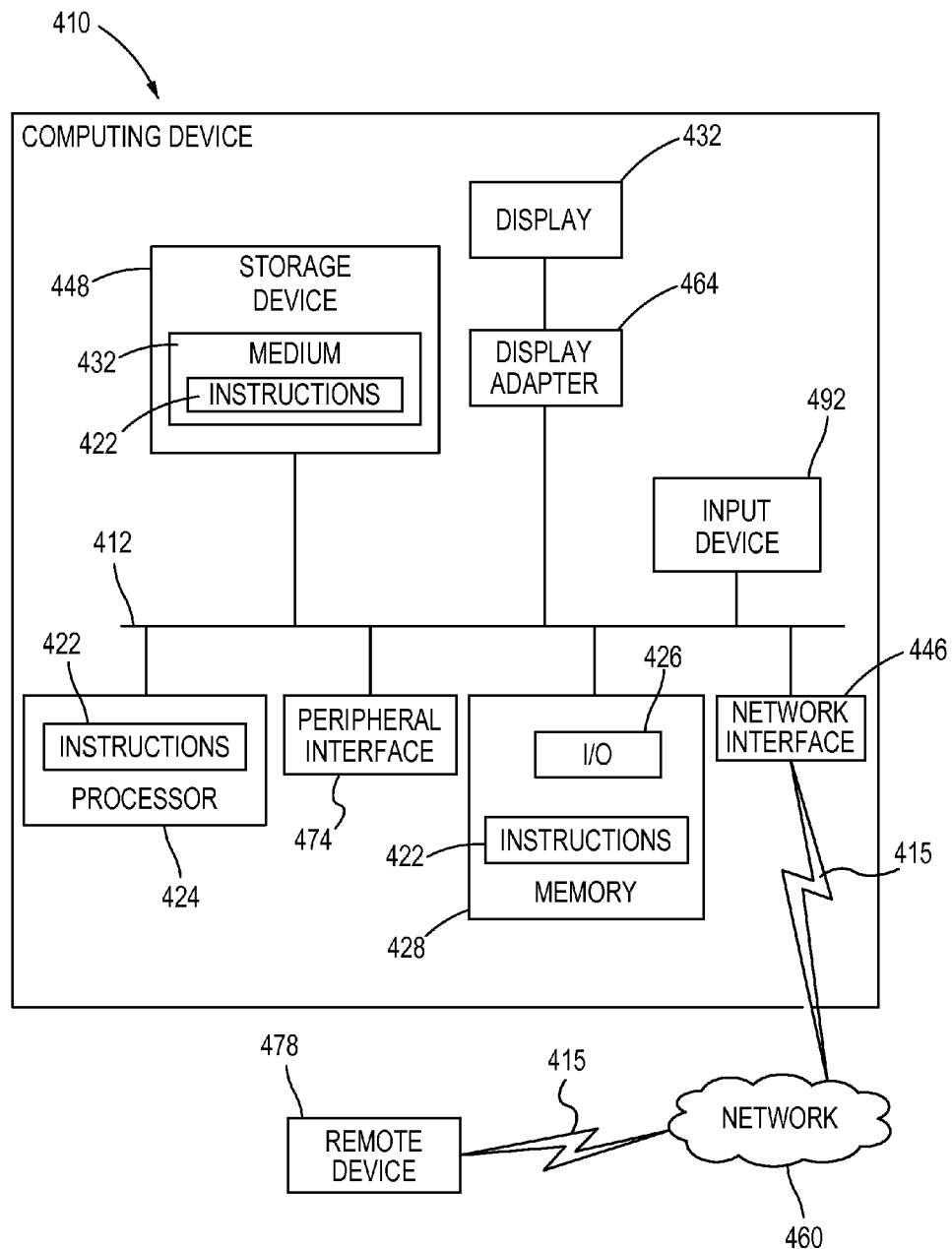
FIG. 4 depicts a block diagram of a computing device according to one embodiment of the invention.

Turning now to FIG. 4 seen is a diagrammatic representation of one embodiment of a machine in the exemplary form of the first computing device 410 within which a set of instructions for causing a device to perform any one or more of the aspects and/or methodologies of the present disclosure to be executed. Computing device 410 includes the processor 424, which communicates with the memory 428 and with other components, via the bus 412. Bus 412 may include any of several types of bus structures including, but not limited to, a memory bus, a memory controller, a peripheral bus, a local bus, and any combinations thereof, using any of a variety of bus architectures.

Memory 428 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 426 (BIOS), including basic routines that help to transfer information between elements within computing device 410, such as during start-up, may be stored in memory 428. Memory 428 may also include (e.g., stored on one or more machine-readable media) instructions (e.g., software) 422 which may comprise the various modules 252, 254, 256 with reference to FIG. 2 and the non-transitory, tangible computer readable storage medium, which are described herein as encoded with processor readable instructions to perform, for example, a method of providing a data file to a remote device, as described herein with reference to the various FIGS. The instructions 422 may embody any one or more of the aspects and/or methodologies of the present disclosure. In another example, memory 428 may further include any number of program modules including, but not limited to, an operating system, one or more application programs, other program modules, program data, and any combinations thereof.

Computing device 410 may also include a storage device 448. Examples of a storage device (e.g., storage device 448) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 448 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 448 may be removably interfaced with computing device 410 (e.g., via an external port connector (not shown)). Particularly, storage device 448 and an associated machine-readable medium 432 may provide nonvolatile and/or volatile storage of machine-readable instructions, data structures, program modules, and/or other data for computing device 410. In one example, instructions 422 may reside, completely or partially, within machine-readable medium 432. In another example, instructions 422 may reside, completely or partially, within processor 424. Such instructions may comprise, at least partially, the instructions mentioned above and throughout herein.

Computing device 410 may also include an input device 492. In one example, a user of computing device 410 may enter commands and/or other information into computing device 410 via input device 492. Examples of an input device 492 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 492 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof.

A user may also input commands and/or other information to computing device 410 via storage device 448 (e.g., a removable disk drive, a flash drive, etc.) and/or a network interface device 446. In one embodiment, the network interface device 446 may comprise a wireless transmitter/receiver and/or may be adapted to enable communication between the one or more of the proxy device 130, application device 140, data removal device, authentication device 160, cache device 170 and remotely-connected second communication device 120. The network interface device 446 may be utilized for connecting computing device 410 to one or more of a variety of networks 460 and a remote device 478. Examples of a network interface device 446 include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network may employ a wired and/or a wireless mode of communication. In general, any network topology may be used. Information (e.g., data, software, etc.) may be communicated to and/or from computing device 410 via network interface device 446.

Computing device 410 may further include a video display adapter 464 for communicating a displayable image to a display device, such as display device 462. Examples of a display device include, but are not limited to, a liquid crystal display (LCD), a cathode ray tube (CRT), a plasma display, and any combinations thereof. In addition to a display device, a computing device 410 may include one or more other peripheral output devices including, but not limited to, an audio speaker, a printer, and any combinations thereof. Such peripheral output devices may be connected to bus 412 via a peripheral interface 474. Examples of a peripheral interface include, but are not limited to, a serial port, a USB connection, a FIREWIRE connection, a parallel connection, and any combinations thereof. In one example an audio device may provide audio related to data of computing device 410 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 462. Accordingly, a digitizer may be integrated with display device 462, or may exist as a separate device overlaying or otherwise appended to display device 462.

In one embodiment, one or more of the medium 432 described with reference to FIG. 4, may comprise a non-transitory, tangible computer readable storage medium 432, encoded with processor readable instructions 422 to perform a method of providing a data file to a remote device 478 such as, but not limited to, the second computing device 120 seen in FIG. 1. One such method may comprise receiving a request for the data file such as, but not limited to the request 115. The request 415 is also seen in FIG. 4 as provided from the remote device 478. The data file may be at least temporarily stored, at least in part, on the memory 428 and/or storage device 448 and may be received at least in part via the network device 446. The data file may be referenced herein as a first data file, first data files, or a first data file copy.

The method performed by the instructions 422 may identify for the first data file, a file type and first authentication level. For example, upon receiving the request 415 and accessing the data file, the instructions may determine the content of the file—whether the file comprises text, images, video, etc., and may determine whether the file is a MS Word® document, a pdf document, a media file etc. HTTP request headers and MIME-type identification may be used, at least in part, to determine the file content. The first identification level may comprise receiving an authentication packet referencing information about the file such as, but not limited to, information relating to which content may be accessed by a set of authentication parameters, which may be provided in a username/password or otherwise in an authentication token comprising a second authentication level. The authentication token may be received at the computing device 410 from the remote device 478 or another device, or may be generated by the computing device 410 with information received, at least in part, from the remote device 478 (e.g., an entered username/password).

The instructions 422 may further comprise implementing one or more redaction modules. For example, the control module 252 may be implemented along with one or more of the plug-in modules 254, 256. These modules may be adapted to remove a portion of the first data file. The modules may also be adapted to determine whether the data file comprises one or more data types. In one such embodiment, the modules may determine if, and subsequently remove, a text-based string. If the content to be removed or not removed by the modules 254, 256 overlap, the control module 252 may apply the module with the higher priority for the data file.

The instructions 422 may further comprise calling the aggregation module 258. One such aggregation module 258 may be adapted to aggregate the output of the plug-in modules 254, 256 into a copy of the first data file. Such a copy may be referred to as a second data file or a single data file. The instructions 422 may then provide the second data file to the remote device 478.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method of providing one or more electronic data files comprising,
   storing a first copy of the one or more electronic data files on a first computing device, wherein a first authentication level is associated with the first copy of the one or more electronic data files;
   receiving at the first computing device a request for the first copy of the one or more electronic data files, wherein, the request for the first copy of the one or more electronic data files is received from a second computing device;
   determining a second authentication level associated with the request;
   in response to receiving the request, using the first authentication level and second authentication level to create a second copy of the one or more electronic data files, wherein, the second copy of the one or more electronic data files comprises a portion of the first copy of the one or more electronic data files; and
   sending the second copy of the one or more electronic data files to the second computing device,
   wherein,
   the first authentication level is referenced in an authentication packet received by the first computing device;
   the second authentication level is referenced in an authentication token received by the first computing device; and
   using the first authentication level and second authentication level to create a second copy of the one or more electronic data files comprises,
      comparing, in response to receiving the request, information in the authentication packet to information in the authentication token, and
      determining which of one or more redaction modules to implement,
   wherein, the one or more redaction modules comprise at least one of,
      a text string redaction module;
      an image matching redaction module; and
      a binary code redaction module, and
   wherein, using the first authentication level and second authentication level to create a second copy of the one or more electronic data files comprises aggregating information received form the text string redaction module, image matching redaction module, and binary code redaction module to create the second copy of the data file,
   wherein the authentication token received by the first computing device is created from a username and password of a user of the second computing device, and
   wherein the first computing device receives the second authentication level associated with the request from an authentication server before the first computing device receives the first authentication level.

2. The method of claim 1 wherein,
   the second computing device comprises a remote mobile computing device; and
   the request for the first copy of the one or more electronic data files comprises an http request from one of,
   a mobile computing device browser, and
   a mobile computing device application.

3. The method of claim 1 wherein, the text string redaction module comprises redacting at least one of,
   one or more keywords;
   one or more expressions; and
   one or more contact information.

4. The method of claim 1 wherein, the image matching redaction module comprises modifying a color of one or more image pixels.

5. The method of claim 1, wherein the request for the first copy of the one or more electronic data files is a first request, and wherein method further comprises:
   temporarily storing the second copy of the one or more electronic data files in a cache for a predetermined period of time;
   receiving a second request for the first copy of the one or more electronic data files; and
   in response to receiving the second request, providing the second copy of the one or more electronic data files from the cache to satisfy the second request.

6. The method of claim 1, further comprising:
   implementing a first redaction module constructed and arranged to remove text strings from the first data file;
   implementing a second redaction module constructed and arranged to remove binary code from the first data file;
   identifying, by the first redaction module, a content portion to be removed from the first data file;
   identifying, by the second redaction module, the content portion as a portion not to be removed from the first data file; and
   wherein the method further comprises assigning a priority to each of the redaction modules, wherein, the priority is based at least in part on the content portion, wherein the content portion to be removed or not removed by the redaction modules overlaps, and wherein the method further comprises applying the redaction module with the higher priority in determining whether to remove or not remove the content portion.

7. A non-transitory, tangible computer readable storage medium, encoded with processor readable instructions to perform a method of providing a data file to a remote device comprising,
   receiving, by a computing device, a request for the data file, wherein,
   the request is received from the remote device, and
   the data file comprises a first data file;
   identifying,
   for the first data file,
      a file type, and
      a first authentication level referenced in an authentication packet received by the computing device, and a second authentication level associated with the request for the data file and received by the computing device in an authentication token;

comparing, upon receiving the request from the remote device, the first authentication level to the second authentication level;

implementing multiple redaction modules, wherein each of the redaction modules is adapted to,
- remove a portion of the first data file based on comparing the first authentication level to the second authentication level, and
- create a redaction module data file;

aggregating each of the redaction module data files into a single data file, wherein the single data file comprises a second data file; and providing the second data file to the remote device, wherein,
the portion of the first data file comprises content type; and further comprising, assigning a priority to each of the redaction modules, wherein, the priority is based at least in part on the first data file content, wherein content to be removed or not removed by the redaction modules overlap, and wherein the method further comprises applying the redaction module with the higher priority in determining whether to remove or not remove the content, wherein the authentication token received by the computing device is created from a username and password of a user of the remote device, and wherein the computing device receives the second authentication level associated with the request from an authentication server before the computing device receives the first authentication level.

8. The non-transitory, tangible computer readable storage medium of claim 7 wherein,
the file type comprises a media file;
the media file comprises at least one image;
at least one of the one or more redaction modules comprises image recognition software; and
the portion of the first data file removed comprises at least a portion of an image.

9. The non-transitory, tangible computer readable storage medium of claim 7 wherein,
the request for the data file comprises an http request; and
the file type is identified through one or more http request headers.

10. The non-transitory, tangible computer readable storage medium of claim 7 further comprising, identifying a first data file content through mime-type identification.

11. The non-transitory, tangible computer readable storage medium of claim 7 wherein the content type comprises one of text, image, and audio.

12. The non-transitory, tangible computer readable storage medium of claim 7 wherein, the one or more redaction modules are further adapted to determine at least a portion of a content type of the first data file.

* * * * *